United States Patent
Hoellriegl et al.

(10) Patent No.: US 8,303,009 B2
(45) Date of Patent: Nov. 6, 2012

(54) GRIPPING ELEMENT FOR GRIPPING PLASTIC CONTAINERS

(75) Inventors: Thomas Hoellriegl, Teublitz (DE); Christian Wittmann, Hemau (DE)

(73) Assignee: Krones AG (DE)

( * ) Notice: Subject to any disclaimer, the term of this patent is extended or adjusted under 35 U.S.C. 154(b) by 330 days.

(21) Appl. No.: 12/707,513

(22) Filed: Feb. 17, 2010

(65) Prior Publication Data

US 2010/0213728 A1   Aug. 26, 2010

(30) Foreign Application Priority Data

Feb. 20, 2009   (DE) .......................... 10 2009 009 885

(51) Int. Cl.
*B25J 15/10* (2006.01)
(52) U.S. Cl. ............ 294/195; 294/203; 294/207; 294/95
(58) Field of Classification Search .................. 294/193, 294/195, 203, 207, 94, 95, 97; 901/37
See application file for complete search history.

(56) References Cited

U.S. PATENT DOCUMENTS

| | | | |
|---|---|---|---|
| 1,775,291 A * | 9/1930 | Niles | 294/86.24 |
| 2,528,873 A * | 11/1950 | Dorman | 279/2.2 |
| 3,075,800 A * | 1/1963 | Rowekamp | 294/194 |
| 3,131,961 A * | 5/1964 | Van Doros | 294/97 |
| 3,265,431 A * | 8/1966 | Burner | 294/86.25 |
| 4,154,350 A * | 5/1979 | Frohn | 414/416.01 |
| 4,199,183 A * | 4/1980 | Hecker | 294/97 |
| 4,340,249 A * | 7/1982 | Bucklew | 294/95 |
| 4,572,355 A * | 2/1986 | Hunter | 198/803.12 |
| 5,190,334 A * | 3/1993 | Sawdon | 294/207 |
| 5,803,521 A * | 9/1998 | Zejda et al. | 294/97 |
| 5,897,153 A * | 4/1999 | Philipps et al. | 294/93 |
| 2002/0024225 A1* | 2/2002 | Ostholt | 294/94 |

FOREIGN PATENT DOCUMENTS

EP   0503191   9/1992

OTHER PUBLICATIONS

Chinese Office Action issued in corresponding application No. 201010126774.0, received Sep. 6, 2012 (5 pgs).

* cited by examiner

*Primary Examiner* — Dean Kramer
(74) *Attorney, Agent, or Firm* — Hayes Soloway P.C.

(57) ABSTRACT

A gripping element for gripping plastic containers with mouths, and in particular performs, includes a carrier on which there is arranged a gripping head which can be introduced at least partially into a mouth of the plastic container. Arranged on the gripping head is at least one holding element which is at least partially movable in a radial direction in relation to the gripping head to secure the container relative to the gripping head.

16 Claims, 5 Drawing Sheets

GRIPPING ELEMENT FOR GRIPPING PLASTIC CONTAINERS

BACKGROUND OF THE INVENTION

The present invention relates to a gripping element for gripping plastic containers and in particular preforms. Such preforms are used in the prior art to be expanded during the production process to form plastic containers, such as PET bottles. During this production process, the plastic preforms are first heated and then expanded in a blowing machine. During this heating process, the preforms are transported by gripping elements.

It is known from the prior art to provide gripping elements which engage in a mouth of these preforms in order to hold the latter. However, different preforms or also different types of preforms sometimes have slightly different internal cross-sections or internal diameters of the mouths and/or bottle necks. But such different diameters can lead to the situation whereby gripping elements cannot pick up some containers since the mouth cross-sections thereof are too small, and other preforms slip off these gripping elements. The gripping elements known to date from the prior art are only able to handle diameter tolerances in the range of +/−0.2 mm.

The object of the present invention is therefore to provide a gripping element which can handle greater tolerances with regard to the performs and the mouth diameters thereof.

SUMMARY OF THE INVENTION

A gripping element according to the invention for gripping plastic containers, and in particular preforms, comprises a carrier on which there is arranged a gripping head which can be introduced at least partially into a mouth of the plastic container.

According to the invention, arranged on the gripping element is at least one holding element which is at least partially movable in a radial direction in relation to the gripping head and can preferably be pressed against the inner wall of the mouth to secure the container relative to the gripping head. An ability to move in a radial direction is understood to mean that at least one region of the holding element is movable at least also in the radial direction. This may be a movement which is inclined angle relative to the radial direction or else a pivoting movement in relation to a predefined axis. Furthermore, it is possible for the holding element to be movable in its entirety in a radial direction, but other movements such as, in particular but not exclusively, pivoting movements would also be conceivable.

This holding element which can move also in the radial direction allows a certain tolerance with regard to the containers to be gripped. In this way, it is possible to handle differences in diameter of the container mouths of up to +/−3 mm.

With preference, at least two and preferably at least three holding elements are arranged on the gripping head. By virtue of a plurality of such holding elements, on the one hand relatively large tolerances with regard to containers can be handled even with a relatively small radial movement, and on the other hand a more stable hold of the container on the gripping head or gripping element can be achieved by virtue of a plurality of holding elements.

In a further preferred embodiment, at least one section of the holding element can be pressed against the inner wall of the mouth of the container. In this way, a secure hold of the container can be achieved. However, it would also be possible for the holding element to act on a further element, for example an O-ring, and to press the latter against the inner wall of the mouth.

In a further advantageous embodiment, a plurality of holding elements are uniformly distributed on the gripping head around the circumference of the gripping head. In this way, too, a very stable hold of the containers on the gripping head is possible. In a further advantageous embodiment, the gripping element comprises five holding elements or seven holding elements. This number of holding elements, in particular five holding elements, has proven to be particularly advantageous for combining a stable hold with a favourable handling of different internal diameters of the containers.

Preferably, at least one holding element is arranged such as to be able to pivot about a predefined pivot axis. By virtue of this pivoting process, a region of the holding element is moved radially outwards to secure the container relative to the gripping head.

In a further advantageous embodiment, the gripping element comprises a piston body which is movable in a longitudinal direction of the carrier, wherein a movement of at least one holding element can be triggered by a movement of the piston body. The longitudinal direction of the carrier is also the longitudinal direction of the container which is arranged on the gripping element. More specifically, the movement of the holding element at least also in the radial direction of the gripping head is triggered by a movement of the piston body. Preferably, the piston body is arranged radially inside the holding elements. With particular preference, the piston body actuates a plurality of the holding elements and particularly preferably all the holding elements.

Preferably, the piston body has a first guide surface which is formed in the circumferential direction of the piston body and which cooperates with the holding elements in order to move the latter. These may be for example oblique surfaces which urge the holding elements radially outwards during the movement of the piston.

In a further advantageous embodiment, the gripping head comprises a covering body, inside which the holding elements are at least partially arranged. The covering body may be a cover which is arranged on the underside of the gripping head and which can be introduced fully into the mouth of the container. Thus an external circumference of this covering body is preferably adapted to the internal circumference of the preform and is particularly preferably slightly smaller than this internal circumference or internal cross-section. For example, it is possible for at least part of the holding elements to be arranged permanently inside the covering body, such as for example the pivot axle about which the holding elements can be pivoted.

In a further advantageous embodiment, the covering body has a plurality of openings arranged in the circumferential direction of the covering body, through which the holding elements extend. For example, it is possible that the holding elements extend radially outwards through the openings to grip the containers.

In a further advantageous embodiment, the covering body has wall sections with an external circumference shaped as a segment of a circle.

In a further advantageous embodiment, the gripping element has a spring device which prestresses the piston body relative to the gripping head. In this case, it is possible for the spring device to prestress the piston body in the upward direction, i.e. away from the container to be gripped.

In a further preferred embodiment, the holding elements have a first guide surface which cooperates with the piston body to move the holding elements radially outwards when the piston body is moved in a first direction, and a second guide surface which cooperates with the piston body to move the holding elements radially inwards when the piston body is moved in a second direction opposite to the first direction. In this embodiment, therefore, both the outward radial movement of the holding elements and also the inward radial movement is brought about by a movement of the piston body relative to the gripping head. This will be explained in more detail with reference to the figures.

In a further advantageous embodiment, the holding elements and/or the elements, respectively, which guide the holding elements are movable exclusively in a radial direction. Furthermore, it is possible that the holding elements are prestressed radially inwards by a flexible ring-shaped body. In addition, it is possible for example that use is made of a ring-shaped body which can be prestressed radially outwards by holding elements, for example pin-like bodies, arranged radially inside relative to this ring-shaped body, which in this case bears against an internal circumference of the thread.

BRIEF DESCRIPTION OF THE DRAWINGS

Further advantages and embodiments will emerge from the appended drawings:

In the drawings:

FIG. 3d shows a perspective top view of the gripping element shown in FIG. 3a;

DETAILED DESCRIPTION OF THE INVENTION

Figure 1:
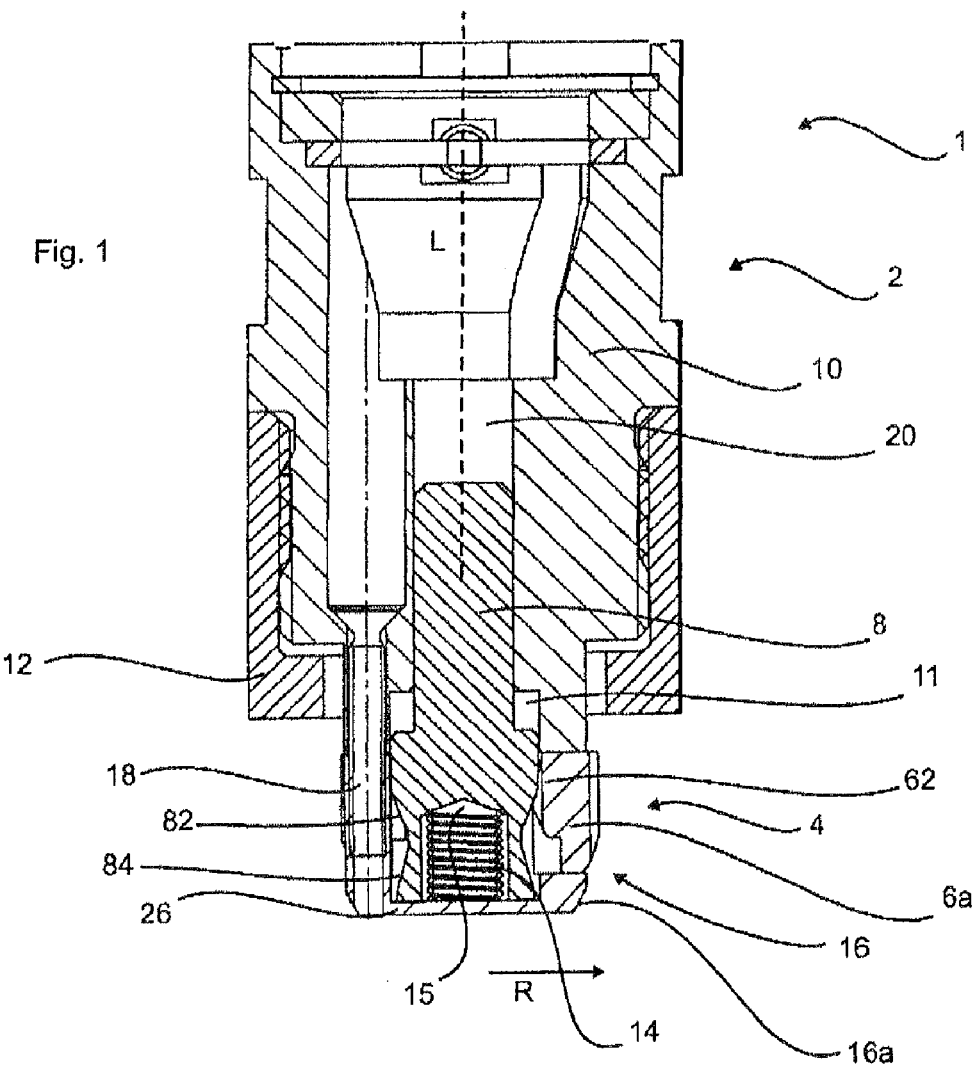
FIG. 1 shows a sectional view of a gripping element according to the invention.

FIG. 1 shows a gripping element 1 according to the invention. This gripping element 1 comprises a carrier 2, on which a gripping head 4 is arranged. This gripping head 4 can be introduced into a mouth of a container (not shown) in order to grip the latter from inside. By means of this gripping element, the containers (not shown) can be transported, for example can be transported through a heating device which heats said containers prior to the actual expansion process.

The carrier 2 comprises a main body 10 and a sleeve body 12. The gripping head 4 is screwed onto this main body 10 by means of an attachment device such as a screw device 18. Just one screw means is shown in FIG. 1, but a plurality of screw means, for example three, may be provided. Reference 8 denotes a piston body which is movable within a bore or recess 20 in a longitudinal direction L of the gripping element. By virtue of this longitudinal movement of the piston body 8, a holding element 6a shown in FIG. 1 can be moved both outwards and inwards in the radial direction R. Reference 14 denotes a spring device which prestresses the piston body 8 in the upward direction in FIG. 1. This spring device is arranged in this case in a recess 15 of the piston body 8.

The piston body 8 has two oblique surfaces or guide surfaces 82 and 84 which serve for moving the holding element 6a and also further holding elements (not shown).

Arranged within the main body 10 is a further recess 11, within which a region of the piston body 8 can move.

Figure 2:
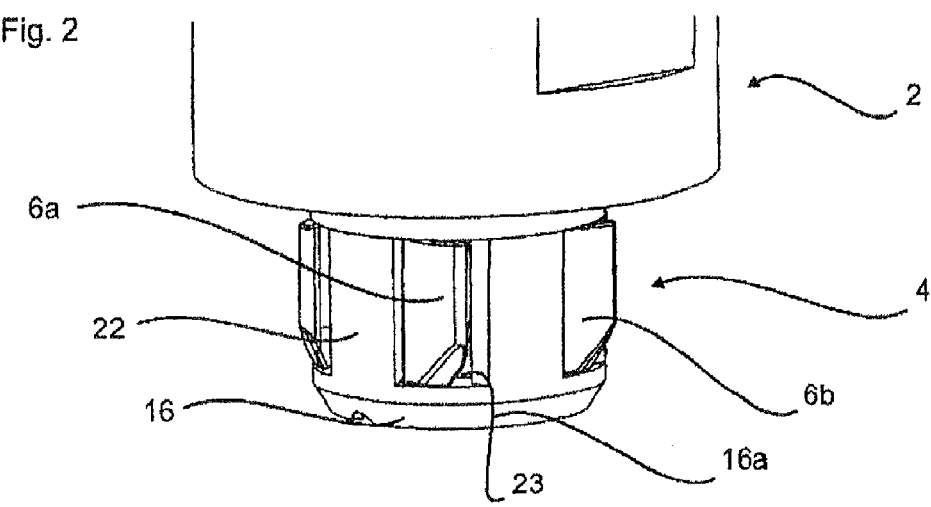
FIG. 2 shows a perspective view of part of the gripping element of FIG. 1.

FIG. 2 shows a perspective view of part of the gripping element according to the invention, more specifically of the gripping head 4 which is introduced into the mouth of the container. On its underside, the gripping element has a covering body 16 which has an insertion inclination 16a in the circumferential direction to facilitate insertion into the mouth of the container.

It is possible to see in FIG. 2 two holding elements 6a, 6b which are pivotable. In this way, a region of these holding elements 6a, 6b can be moved radially outwards. Reference 22 denotes wall sections with an external circumference in the shape of a segment of a circle, between which in each case openings 23 are provided, through which the holding elements can extend and move. These wall sections 22 thus form part of the covering body 16.

Figure 3A:
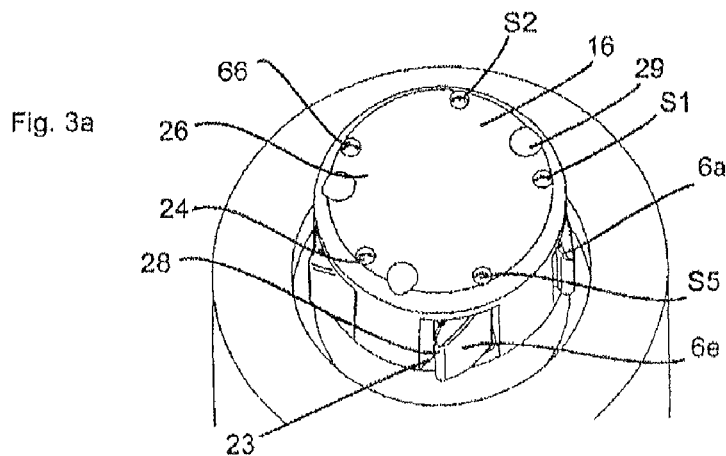
FIG. 3a shows a perspective top view of a gripping element according to FIG. 1 from below.

FIG. 3a shows a top view of a gripping element according to the invention from below. There can be seen here five openings 24 in the covering body 16 or the lower plate 26 of the covering body 16, in which the holding elements 6a-6e are guided by means of pivot axles or shafts 66. These openings 24 thus also define pivot axes S1-S5, about which the holding elements 6a-6e are guided. Furthermore, it is also possible to see the regions 29 in which the screw means shown in FIG. 1 extend in the longitudinal direction L.

Figure 3B:
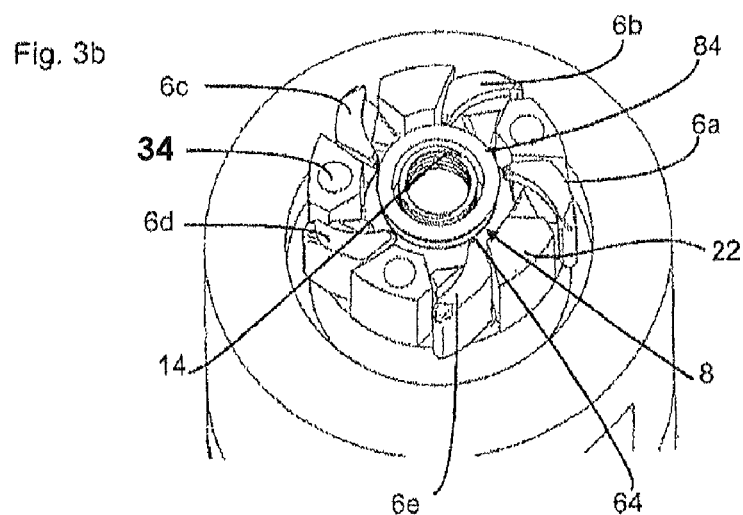
FIG. 3b shows a perspective top view of the gripping element of FIG. 1 from below.

FIG. 3b shows a view of the gripping element from below, wherein here the lower plate 26 has been removed. It is possible to see a plurality of segments 22 which are rigidly arranged and have an external cross-section in the shape of a segment of a circle. Some of these segments 22 have openings 34 for arranging the covering plate 26 thereon.

It is also possible to see in the sectional view of FIG. 3b the spring device 14 which prestresses the piston body in the upward direction. This spring device 14 is supported against the baseplate 26 (cf. FIG. 3a). It is also possible to see in FIG. 3b the design of the holding elements 6a-6e, which in each case cooperate with the piston body 8 to be urged outwards or inwards.

Figure 3C:
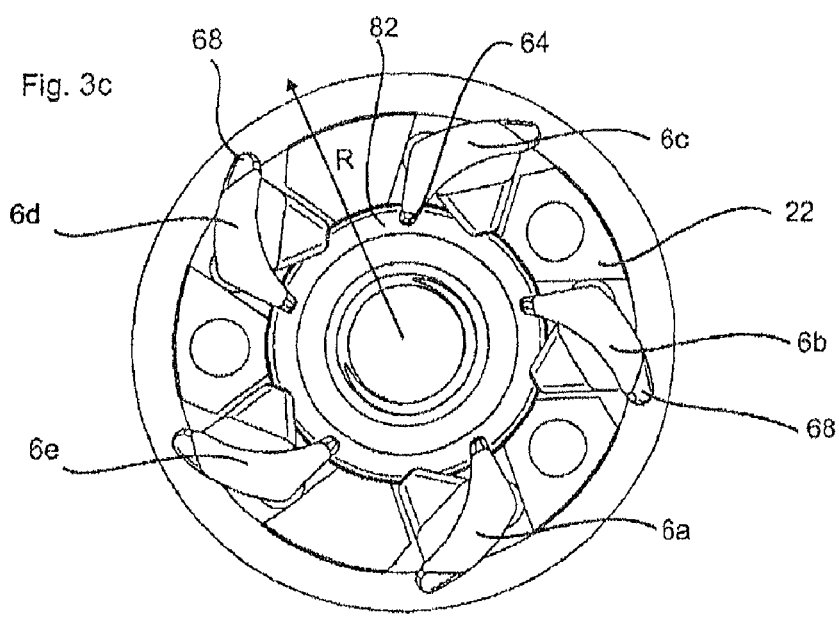
FIG. 3c shows a top view of the gripping element of FIG. 1 from below.

FIG. 3c shows a top view of a gripping element according to the invention from below. As mentioned above, the holding elements 6a-6e are pivotable about a predefined pivot axis and in this way an at least also radial movement of the section 68 of the holding elements in the radially outward or radially inward direction is brought about.

Figure 3D:
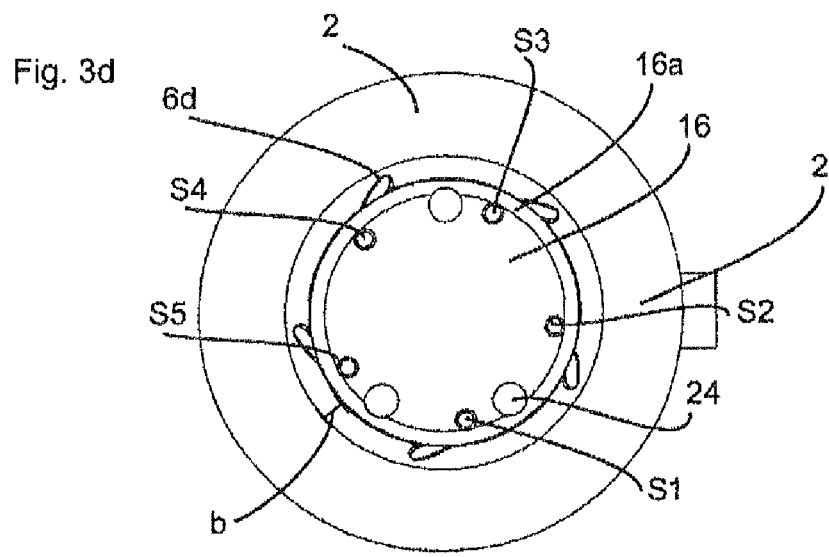

FIG. 3d shows a further view of a entire gripping element from below, wherein here the main body 2 is also illustrated. The holding elements 6a are in this case movable in the radial area r of the gripping element, and the radial tolerance of the containers to be gripped is also defined by this adjustment range.

Figure 4:
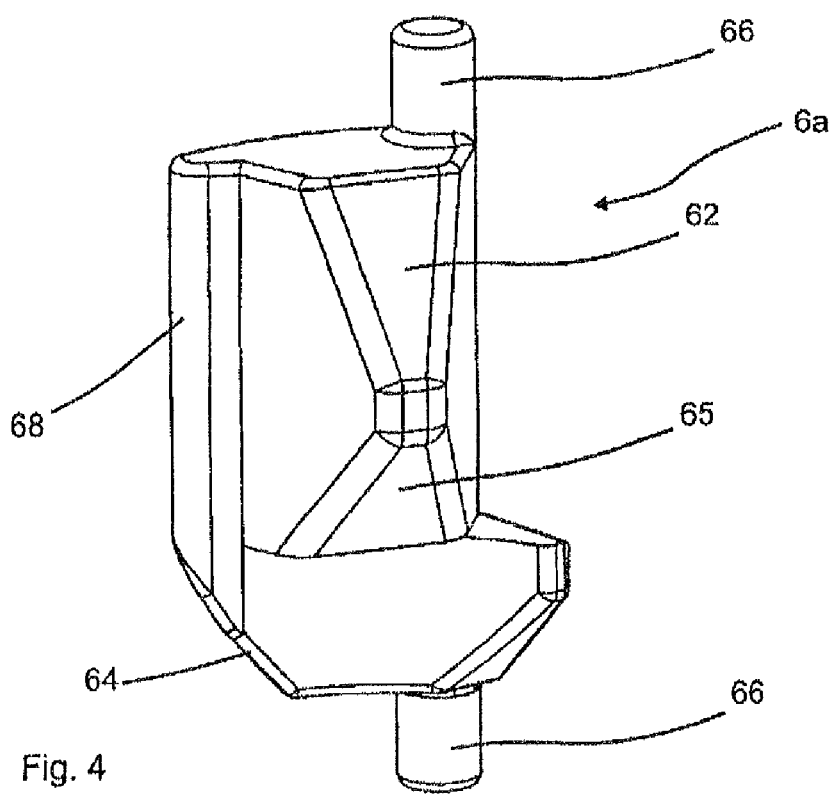
FIG. 4 shows a holding element for a gripping element according to the invention.

FIG. 4 shows a perspective view of a holding element 6a. Here, reference 66 denotes a pivot axle, about which the holding element can pivot. Reference 68 denotes a pressing section of the holding element 6a, which can be pressed against an inner wall of the container. Furthermore, the holding element has an oblique surface or guide surface 62 which cooperates with the section 82 of the piston body 8 shown in FIG. 1. When the piston body is moved downwards in the longitudinal direction of FIG. 1, the surface 62 makes contact with the surface 82 of the piston body and in this way the holding element 6a is pivoted about the pivot axle 66 and pushed outwards.

Reference 64 denotes a further oblique surface, which cooperates with the section 84 of the piston body 8 and therefore brings about a return movement of the holding element 6a when the piston body 8 is moved upwards in the longitudinal direction L of FIG. 1. In this way, both an outward movement of the holding elements 6a-6e and the return movement of the holding elements can be achieved by a cooperation of the oblique surfaces 62 and 64 with the surfaces 82 and 84 of the piston body 8, depending on the direction of movement of the piston body 8. Reference 65 denotes a further guide surface.

Figure 5:
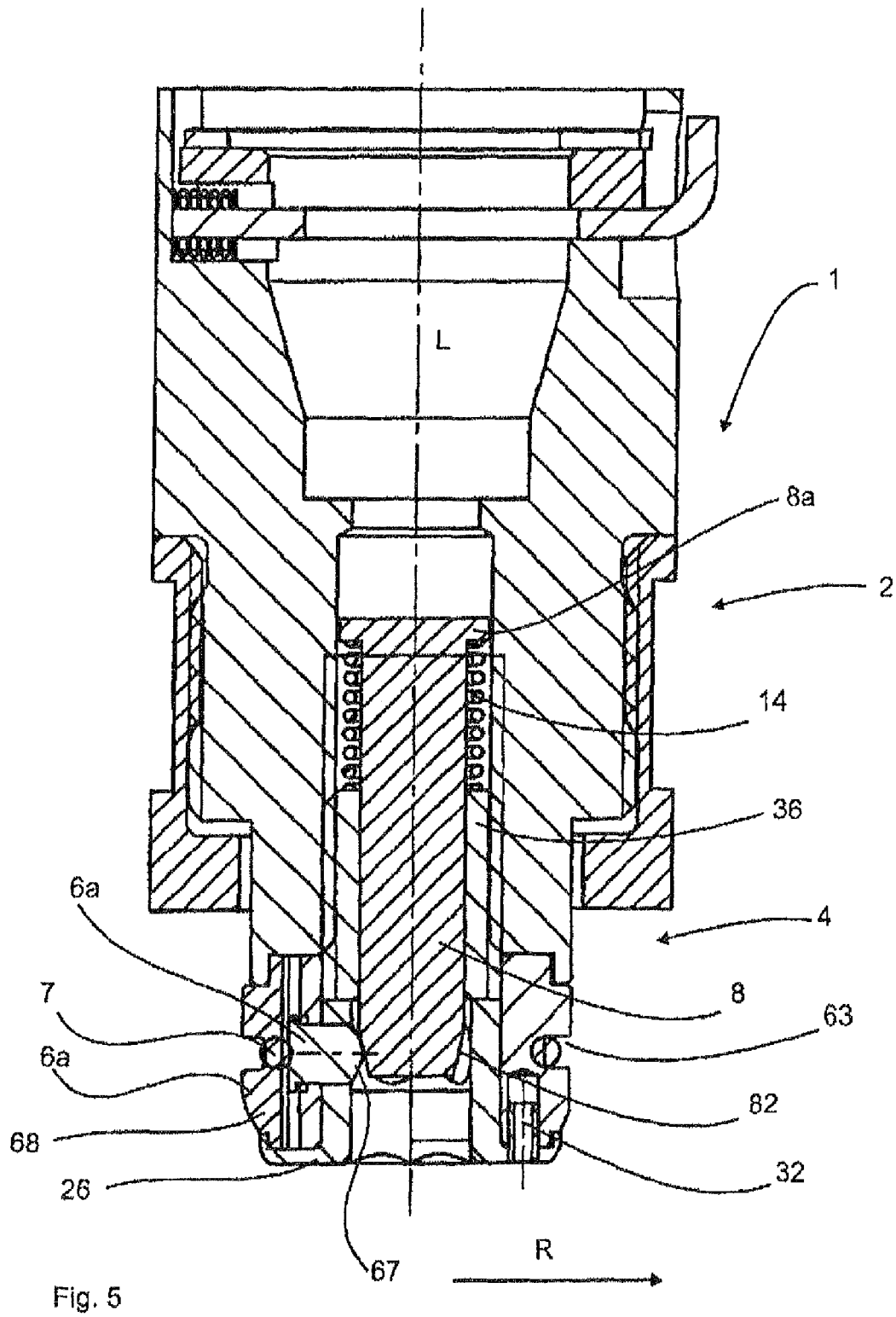
FIG. 5 shows a further embodiment of a gripping element according to the invention.

FIG. 5 shows a further embodiment of a gripping element according to the invention. Here too, as in the case discussed above, a carrier 2 is provided, on which a gripping head 4 is arranged. This embodiment also provides a piston body 8 which is displaceable in a longitudinal direction L of the gripping element 1 and is likewise prestressed in the upward direction here by a spring device 14. In contrast to the embodiment shown in FIG. 1, however, here the spring device 14 is arranged further above, i.e. inside the carrier 2.

More specifically, a cylindrical body 36 is provided, against which the spring device 14 is supported. At the other side, the spring device 14 is supported on a protrusion 8a of the piston body 8.

At its lower end, the piston body 8 has a conical circumferential surface 82 which cooperates with the holding elements 6a to move the latter in the radial direction R.

The holding elements 6a have in this case a contact section 67 which cooperates with the piston body 8, and also the region 68 which cooperates with the inner wall of the container (not shown).

Reference 32 denotes here once again to a screw device for arranging a plate 26 on the gripping head 4. Reference 7 denotes a prestressing device such as an O-ring in this case, which extends in the circumferential direction around all the holding elements 6a and/or lies in a groove 63 formed by the holding elements. This O-ring prestresses the individual holding elements 6a-6e radially inwards and thus brings about a return movement of the individual holding elements 6a-6e if the piston body 8 is moved upwards in the longitudinal direction L.

Figure 6:
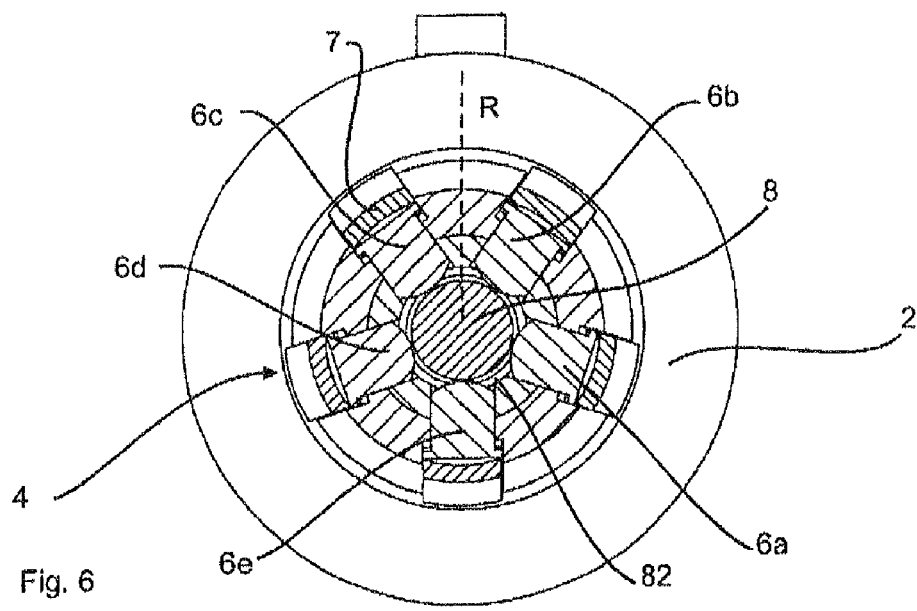
FIG. 6 shows a top view of the gripping element of FIG. 5 from below.

FIG. 6 shows a top view from below of a gripping element according to the invention in the second embodiment. It is possible to see here once again the five holding elements 6a-6e, which are prestressed outwards in the situation shown in FIG. 6, i.e. in this case the piston body 6 is moved downwards. Furthermore, it is also possible to see in this view part of the O-ring 7 which returns the holding elements in the radial direction R.

Figure 7:
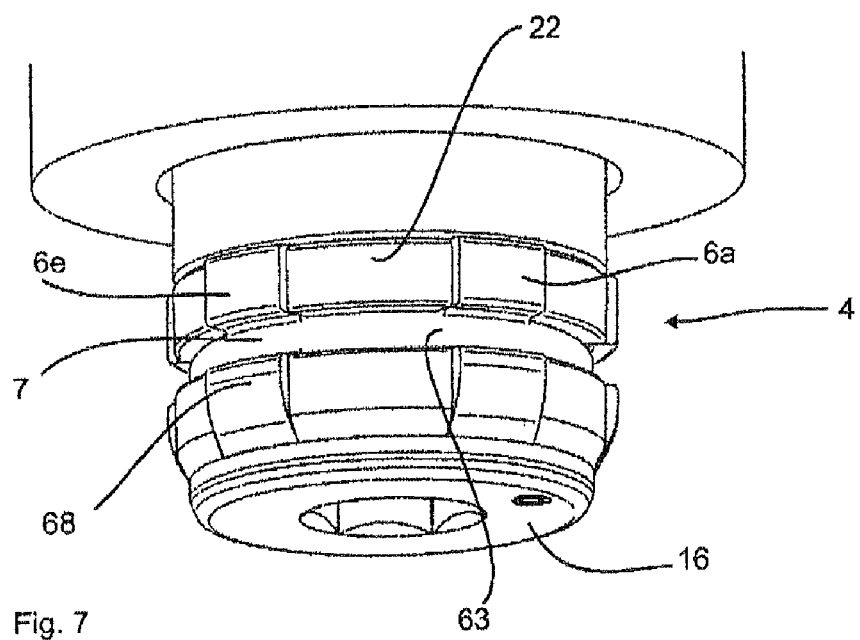
FIG. 7 shows a perspective view of the gripping element of FIG. 5.

FIG. 7 shows a perspective view of a gripping head 14. Here, two holding elements 6a, 6e can be seen, which are in each case moved radially outwards. To prestress the holding elements inwards, the O-ring 7 is arranged in the above-described groove 63 which is formed both by the holding elements 6a-6e and by the sections 22 arranged therebetween. Reference 68 once again denotes the contact region which is pressed against the inner wall of the container or preform (not shown).

All of the features disclosed in the application documents are claimed as essential to the invention in so far as they are novel individually or in combination with respect to the prior art.

The invention claimed is:

1. A gripping element for gripping plastic containers with mouths, comprising a carrier on which there is arranged a gripping head which can be introduced at least partially into a mouth of the plastic container, wherein arranged on the gripping head are at least three holding elements which are at least partially movable in a radial direction in relation to the gripping head to secure the container relative to the gripping head, and wherein the at least three holding elements are arranged pivotable around a predefined pivot axis, and all the pivot axes, of the holding elements are parallel to each other, wherein the gripping element comprises a piston body which is movable in a longitudinal direction (L) of the carrier, and wherein a movement of at least one holding element can be triggered by a movement of the piston body.

2. The gripping element according to claim 1, wherein at least one section of at least one of the holding elements can be pressed against the inner wall of the mouth.

3. The gripping element according to claim 1, wherein said holding elements are uniformly distributed on the gripping head around the circumference of the gripping head.

4. The gripping element according to claim 1, wherein the piston body has a first guide surface which is formed in the circumferential direction of the piston body and which cooperates with the holding elements to move the latter.

5. The gripping element according to claim 1, wherein the gripping head comprises a covering body, inside which the holding elements are at least partially arranged.

6. The gripping element according to claim 5, wherein the covering body has a plurality of openings arranged in the circumferential direction, through which the holding elements extend.

7. The gripping element according to claim 5, wherein the covering body has wall sections with an external circumference shaped as a segment of a circle.

8. The gripping element according to claim 5, wherein the covering body is arranged on the underside of the gripping head and can be introduced fully into the mouth of the container.

9. The gripping element according to claim 5, wherein an external circumference of the covering body is adapted to an internal circumference or internal cross-section of a perform and is slightly smaller than the internal circumference or internal cross-section.

10. The gripping element according to claim 1, wherein the gripping element has a spring device which prestresses the piston body relative to the gripping head.

11. The gripping element according to claim 1, wherein the holding elements have a first guide surface which cooperates with the piston body to move the holding elements radially outwards when the piston body is moved in a first direction, and a second guide surface which cooperates with the piston body to move the holding elements radially inwards when the piston body is moved in a second direction opposite to the first direction.

12. The gripping element according to claim 1, wherein the holding elements are movable exclusively in a radial direction.

13. The gripping element according to claim 1, wherein the holding elements have a contact section which cooperates with the piston body, and also a pressing section which cooperates with an inner wall of the container.

14. The gripping element according to claim 1, wherein the holding elements are pivotable about a predefined pivot axis, whereupon a movement of a pressing section in the radially outward or radially inward direction may be brought about.

15. The gripping element according to claim 1, wherein the holding elements have oblique surfaces, which cooperate with guide surfaces of the piston body, whereupon depending on a direction of movement of the piston body, a outward movement and a return movement of the holding elements can be achieved.

16. The gripping element according to claim 1, wherein pivot axes of the holding elements are parallel to a longitudinal direction of the carrier.

* * * * *